US012722723B2

(12) United States Patent
Schall et al.

(10) Patent No.: US 12,722,723 B2
(45) Date of Patent: Sep. 1, 2026

(54) WORK MACHINE COMPRISING AN ELECTRIC TRACTION DRIVE

(71) Applicant: Liebherr-Werk Nenzing GmbH, Nenzing (AT)

(72) Inventors: Paul Schall, Feldkirch (AT); Markus Schwarzhans, Schruns (AT); Dominik Wachter, Innerbraz (AT)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 436 days.

(21) Appl. No.: 18/465,813

(22) Filed: Sep. 12, 2023

(65) Prior Publication Data

US 2024/0092436 A1 Mar. 21, 2024

(30) Foreign Application Priority Data

Sep. 21, 2022 (DE) ..................... 20 2022 105 317.0

(51) Int. Cl.

| | |
|---|---|
| ***B62D 55/06*** | (2006.01) |
| ***B66C 9/14*** | (2006.01) |
| ***F16L 57/06*** | (2006.01) |
| ***H01B 7/17*** | (2006.01) |

(52) U.S. Cl.

CPC .............. *B62D 55/06* (2013.01); *F16L 57/06* (2013.01); *B66C 9/14* (2013.01); *H01B 7/17* (2013.01)

(58) Field of Classification Search

CPC . B62D 55/06; F16L 57/06; B66C 9/14; B66C 13/12; H01B 7/17; B60K 2007/0038; B60K 7/0007; B60L 1/02; B60L 50/50; B60L 2200/40; B60L 2220/42; B60L 2240/425; B60L 3/00; B60L 3/0023; B60L 3/04; B60L 1/003; E02F 3/58; E02F 9/02; E02F 9/0858; E02F 9/2091; E02F 9/2095; E02F 9/207

See application file for complete search history.

(56) References Cited

U.S. PATENT DOCUMENTS

| | | | |
|---|---|---|---|
| 2020/0102720 A1 | 4/2020 | Jelinek et al. | |
| 2022/0074163 A1 | 3/2022 | Terashima et al. | |

FOREIGN PATENT DOCUMENTS

| | | | | |
|---|---|---|---|---|
| DE | 102012104176 B4 * | 7/2016 | .............. E02F 9/264 |
| DE | 202018101686 U1 * | 4/2018 | ........... H02G 11/006 |
| DE | 102018212951 A1 * | 2/2020 | ........... A01D 43/087 |
| JP | H09144060 A | 6/1997 | |
| JP | 3583533 B2 | 11/2004 | |
| JP | 2010121327 A | 6/2010 | |
| JP | 5420458 B2 | 2/2014 | |
| JP | 2014177181 A * | 9/2014 | |

(Continued)

*Primary Examiner* — Drew J Brown

(74) *Attorney, Agent, or Firm* — McCoy Russell LLP

(57) ABSTRACT

The disclosure relates to a work machine, in particular a duty-cycle crawler crane, having an undercarriage which comprises a middle part and at least one crawler carrier connected to the middle part and having at least one electric traction drive, wherein at least one energy transmission line for supplying power to the traction drive and at least one further supply line runs between the traction drive and the middle part. According to the disclosure, the at least one energy supply line and the at least one further supply line run together in a separate protection means outside the middle part and the crawler carrier.

20 Claims, 3 Drawing Sheets

(56) References Cited

FOREIGN PATENT DOCUMENTS

| | | | | | |
|---|---|---|---|---|---|
| JP | 2019044370 A | * | 3/2019 | | |
| JP | 2019190104 A | | 10/2019 | | |
| JP | 3223818 U | * | 11/2019 | ........... | H01R 13/005 |
| JP | 2021156049 A | | 10/2021 | | |

* cited by examiner

WORK MACHINE COMPRISING AN ELECTRIC TRACTION DRIVE

CROSS REFERENCE TO RELATED APPLICATION

The present application claims priority to German Patent Application No. 20 2022 105 317.0 filed on Sep. 21, 2022 The entire contents of the above-listed application are hereby incorporated by reference for all purposes.

TECHNICAL FIELD

The present disclosure relates to a work machine, in particular a duty-cycle crawler crane.

BACKGROUND

In electrically driven work machines with crawler tracks, electric traction drives or traction motors in the form of electric motors are typically arranged on the crawler carriers which drive the crawler chains. Such work machines often have an undercarriage with a middle part on which the crawler carriers are mounted, wherein a superstructure can be rotatably mounted on the middle part.

SUMMARY

The electric traction drives are usually supplied with power and, if necessary, coolant from the undercarriage. The traction drives are typically connected to the work machine's high-voltage (HV) on-board power supply system, wherein power electronics arranged on or in the undercarriage handles communication with the traction drives and modulation of current and voltage to power the traction drives. Power supply to the traction drives occurs via energy supply lines (typically AC three-phase power cables connected to an inverter on the power electronics). In addition, there are often a number of other supply lines such as coolant lines, control lines for controlling the traction drives and/or signal lines for transmitting sensor signals, for example.

These motor lines must be routed from the undercarriage middle part to the individual traction drives on the crawler carriers in such a way that they are protected against mechanical damage due to the harsh construction site environment. It is therefore known from the prior art to route the motor lines from the middle part to the traction drives through the steel structure of the undercarriage into the crawler carriers, where they are connected to the traction drives. This provides effective protection of the motor lines against mechanical damage. However, the cable routing is predetermined by the geometry of the undercarriage middle part and crawler carriers and is therefore typically not optimized in terms of transmission length. In addition, mounting and demounting of the crawler carrier is sometimes elaborate due to the motor lines running in the steel structure.

Against this background, the object underlying the present disclosure is to optimize the cable routing of the motor lines in generic electrified work machines and, in particular, achieving simplification of mounting and demounting of the crawler carriers.

According to the disclosure, this object is achieved by a work machine as described herein.

According thereto, a work machine is proposed which comprises an undercarriage with a middle part and at least one crawler carrier connected to the middle part. The work machine may, for example, be a duty-cycle crawler crane. The at least one crawler carrier has at least one electric traction drive, which in particular drives a crawler chain of the crawler carrier.

At least one energy transmission line for supplying energy to the traction drive and at least one further supply line runs between the traction drive and the middle part. All of these lines running between the middle part and the traction drive are referred to as motor lines in the following and are used to supply the traction drive.

According to the disclosure, the at least one energy supply line and the at least one further supply line run together in a separate protection means which extends outside the middle part and crawler carrier. In other words, the motor lines are not laid inside the steel structure of the undercarriage as in known machines, but run at least partially, in particular largely, outside the middle part and crawler carrier inside the separate protection means. In particular, the protection means is not part of the undercarriage steel structure, but a separate protective sheath for direct routing of the motor lines from the middle part to the traction drive. The protection means provides mechanical protection against damage to the motor lines running inside it in the outer area of the work machine.

The direct and external routing of the motor lines of the electric traction drive ensures easy accessibility. This makes it easier to detach the motor lines from the corresponding connections on the crawler carrier or traction drive and/or on the middle part and to connect them to these, for example for transport-related mounting/demounting of the crawler carrier or for adaptation to a current machine configuration.

In addition, the length of the motor lines, i.e. the at least one energy supply line and the at least one further supply cable, is reduced because they do not run within the steel structures of the middle part and crawler carrier but more or less directly from the middle part to the traction drive. Particularly in the case of signal lines such as resolver cables, this results in an improvement in signal transmission quality.

In one possible embodiment is provided that protection means is designed to be flexible, i.e. movable or deformable, at least in sections. Preferably, the entire protection means is designed to be flexible. Due to the mechanical flexibility of the protection means, the cable routing can be adapted to a current machine configuration, for example to the presence of a central ballast or in accordance with a current assembly state of the work machine. The motor lines do not have to be re-routed for this purpose, but can be guided or diverted to the desired connection point on the traction drive by the flexible protection means.

Optionally, one or more guide elements, for example in the form of rods, hooks, bushings, hose fasteners or the like, can be provided on the crawler carrier and/or on the middle part, which guide the flexible protection means or hold it in a specific position or at least in a specific spatial area.

In another possible embodiment, the protection means comprises a robot chain or energy chain within which the motor lines run. The energy chain provides flexible and protected guidance of the motor lines. Alternatively or additionally, the protection means may comprise a hose jacket within which the motor lines run. The hose jacket can be made of plastic or a composite material. Furthermore, it is conceivable that the hose jacket consists of a mesh or fabric, which may be made of plastic, metal, a composite material, or a combination thereof. Such a hose also provides flexible and protected guidance of the motor lines. It is conceivable that the protection means is formed by an energy chain, a hose jacket or a combination (i.e. different sections that are formed differently from one another).

In another possible embodiment, it is provided that the protection means completely surrounds the at least one energy transmission line and the at least one further supply line. This means that the enclosed motor lines are ideally protected from mechanical damage or contamination in the external area of the work machine. This does not rule out the possibility (as in the case of an energy chain, for example) of openings, gaps or other recesses being formed in the protection means, e.g. in order to ensure mechanical flexibility.

In another possible embodiment, it is provided that the lines running inside the safety protection means have connections via which they can be disconnected from or connected to connections on the middle part side and/or traction drive side. For example, the respective lines (i.e. the at least one energy supply line and the at least one further supply line) can each have their own connection, so that the motor lines can each be connected or disconnected individually. Alternatively, it is conceivable that the protection means has a common connection to which the respective motor lines are connected, so that the entire protection means or all motor lines running therein can be quickly and easily disconnected and connected together, for example in the form of a quick coupler for different media such as current, coolant etc.

The connections can be present at the end on the crawler carrier or traction drive side or at the end on the middle part side or at both ends of the motor lines or the protection means. The connections can be standard connectors, sockets, plugs or the like for the respective transmitted media (current, liquid, gas, etc.).

In another possible embodiment, it is provided that the connections for making and breaking the connections are accessible from outside the middle part and/or crawler carrier. In particular, the connections are arranged outside the middle part and/or crawler carrier in the connected state. As a result, the motor lines can be easily and quickly disconnected from the respective connection points on the crawler carrier and/or middle part, for example when the crawler carrier is demounted. A connection can be made just as smoothly and quickly. In contrast, if the lines were routed via the steel structure of the middle part into the crawler carrier, it would have to be ensured, for example by an opening in the steel structure, that the corresponding connection points are accessible, which makes mounting/demounting considerably more difficult and time-consuming.

In another possible embodiment, at least one further supply line is provided, which is a coolant line for providing coolant for the traction drive. The coolant can be liquid or gaseous and is used to cool the traction drive or electric motor. It is conceivable that two or more coolant lines are provided, all of which run together with the at least one energy supply line inside the protection means.

In another possible embodiment, at least one further supply line is provided, which is a signal line for transmitting control signals to the traction drive and/or for transmitting sensor signals to a controller. Said control system may be an inverter or a separate control unit. Such a control line is used in particular for controlling the traction drive. The control can take place via an inverter, which is arranged in particular in the middle part. Several control and/or signal lines may be provided to transmit different signals. One or more signal lines may be a resolver cable.

In another possible embodiment, at least two, preferably three, energy supply lines are provided for supplying power to the traction drive, all of which run inside the protection means together with the at least one further supply line. In particular, three phase AC cables can be provided, running for example between an inverter and the traction drive and providing the power supply required for electric motor operation.

In another possible embodiment, it is provided that the at least one energy supply line connects the traction drive to an inverter, which is preferably arranged in the middle part of the undercarriage. The inverter may be part of a high-voltage on-board power supply system of the work machine, which comprises several electronic components arranged in the undercarriage, preferably in the middle part. The inverter may provide communication with the traction drive (i.e., control) and/or modulation of current and voltage to supply power to the traction drive.

In another possible embodiment, it is provided that the cable routing of the protection means is adaptable to a machine configuration of the work machine. Preferably, a central ballast (or several central ballast elements) can be attached to the undercarriage, wherein a different routing of the motor lines is required or appropriate for each configuration (central ballast attached or removed). Due to the separate or direct routing of the motor lines within the common protection means and, in particular, due to a preferred flexible design of the protection means, the cable routing can be flexibly adapted to the current machine configuration, which avoids costly reconstruction measures of the cabling.

In another possible embodiment, at least two crawler carriers connected to the middle part are provided, which are arranged in particular on opposite sides of the middle part. The crawler carriers each have at least one traction drive, the motor lines of which run to the middle part in a separate protection means associated with the respective traction drive. The protection means can run essentially symmetrically to a central longitudinal axis of the undercarriage.

BRIEF DESCRIPTION OF THE FIGURES

Further features, details and advantages of the disclosure will be apparent from the exemplary embodiment explained below with reference to the Figures. Shown are in.

DETAILED DESCRIPTION

Figure 1:
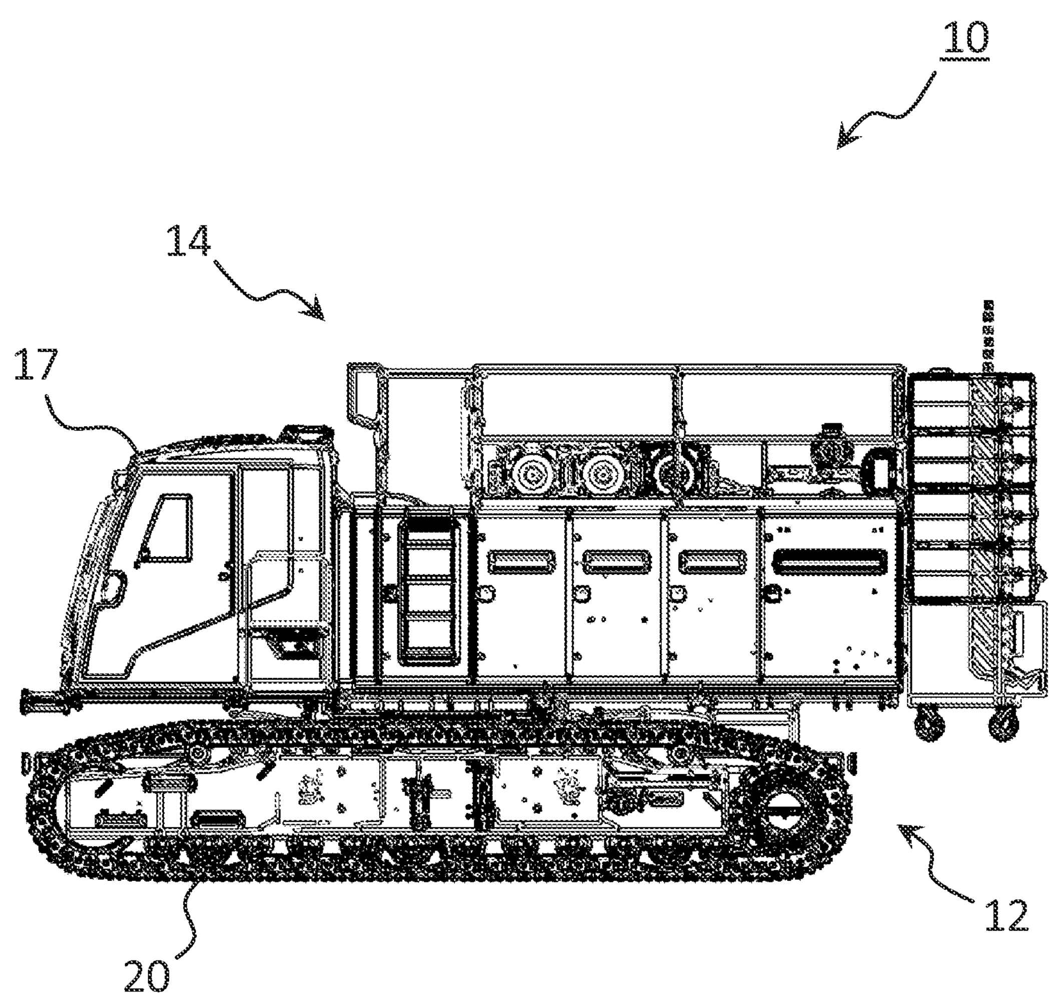
FIG. 1: A side view of undercarriage and superstructure of the work machine according to the disclosure in accordance with a preferred exemplary embodiment.
Figure 2:
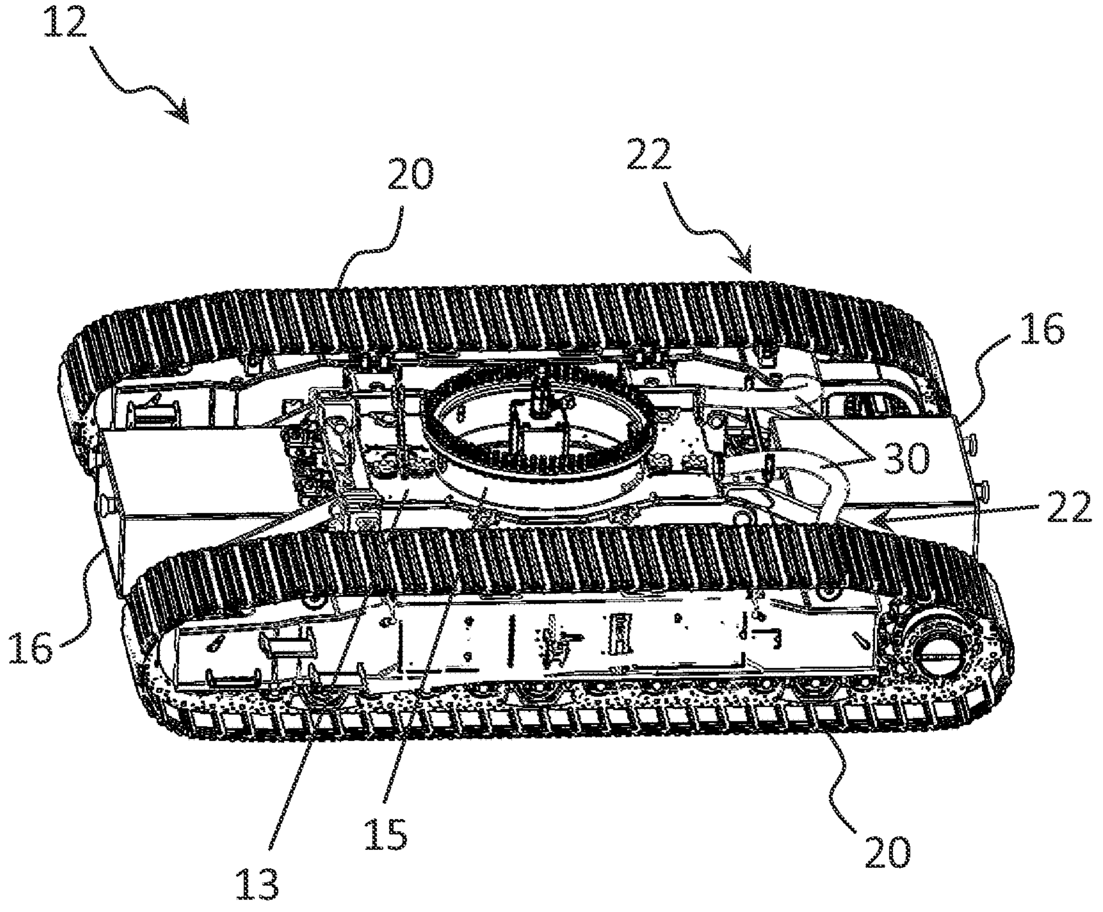
FIG. 2: a perspective view of the undercarriage of the work machine according to FIG. 1.

FIG. 1 shows a preferred exemplary embodiment of the work machine 10 according to the disclosure in a side view. The exemplary embodiment shown is a duty-cycle crawler crane 10 with a mobile undercarriage 12 and a superstructure 14 rotatably mounted on the undercarriage 12 about a vertical axis of rotation. FIG. 2 shows the undercarriage 12 in a perspective view. The boom of the duty-cycle crawler crane 10 is not shown here. The superstructure 14 has a driver's cab 17 and is rotatably connected to a middle part 13 of the undercarriage 12 via a slewing ring 15, which can be seen in FIG. 2.

Two crawler tracks 20 are attached to the side of the middle part 13 so that the middle part 13 is placed centrally between the crawler carriers 20 of the crawler chassis. The crawler carriers 20 have electric traction drives 22 which drive the crawler tracks and whose position is indicated by arrows in FIG. 2. The traction drives 22 are, in particular, electric motors.

The electric traction drives 22 are supplied and controlled from the middle part 13. For this purpose, three energy supply lines 40 in the form of AC phase cables are provided for each traction drive 22 in the exemplary embodiment shown here, which supply the respective traction drive 22 with power from the HV vehicle electrical system. The energy supply lines 40 run between the traction drives 22 and an inverter (not shown), which is arranged in the middle part 13.

Furthermore, the traction drives 22 are controlled via one or more control lines 42. Communication with the traction drives 22 can also be handled by the inverter or a separate control element. In addition, one or more signal lines 42 may be provided, for example to transmit sensor signals from the traction drives 22 to a controller (or the inverter) in the middle part 13. Finally, the traction drives 22 are preferably cooled. For this purpose, each traction drive 22 can be connected to a cooling circuit, with two coolant lines 44 running between the middle part 13 and each of the traction drives 22, which supply the coolant to the traction drives 22 and convey the heated coolant back to the middle part 13. These lines 42, 44, which are provided in addition to the energy supply lines 40, are referred to herein as additional supply lines 42, 44. All lines 40, 42, 44 together, which run between the traction drives 22 and the middle part 13, are referred to herein in abbreviated form as motor lines 40, 42, 44.

In this exemplary embodiment, the inverter preferably handles both communication with the traction drives 22 and modulation of current and voltage to power the traction drives 22.

The precise configuration of the power supply system or the power electronics of the work machine 10 for supplying the traction drives 22 is not relevant to the disclosure and depends on the configuration of the traction drives 22.

The motor lines 40, 42, 44 must be routed from the middle part 13 to the traction drives 22 on the crawler carriers 20. In the prior art, this is for example achieved by routing the lines within the steel structure of the undercarriage 12 into the crawler carriers 20 and further on to the traction drives 22. Although this provides good mechanical protection of the motor lines 40, 42, 44 from damage and soiling, it also results in longer cable lengths and makes mounting/demounting of the crawler carriers 20 more difficult due to the limited accessibility of the motor lines 40, 42, 44.

For this reason, a different approach is taken in the case of the work machine 10 according to the disclosure. Here, the motor lines 40, 42, 44 are routed outside the steel structure of the undercarriage 12 directly from the middle part 13 to the traction drives 22. In order to provide the necessary mechanical protection, the motor lines 40, 42, 44 run inside special-purpose protection means 30 that extend between the middle part 13 and the crawler carriers 20 in the area of the traction drives 22. The protection means 30 are not part of the steel structure of the undercarriage 12.

In addition, the protection means 30 are in particular designed to be flexible, i.e. they are movable. This allows the cable routing to be varied. For this purpose, the protection means 30 can be designed at least in sections, for example, as energy chains or hoses (or as a combination thereof) consisting of several links connected to each other in an articulated manner. Preferably, the entire length of the protection means 30 between the middle part 13 and the crawler carrier 20 is configured to be flexible.

In the exemplary embodiment shown here, the protection means 30 are configured as a hose jacket inside which the motor lines 40, 42, 44 run, cf. FIG. 2. Compared to the conventional solution of routing the motor lines 40, 42, 44 from the middle part 13 centrally into the crawler carriers 20 and then along the longitudinal axis of the crawler carriers 20 to the traction drives 22, this results in considerably shorter cable lengths.

Figure 3:
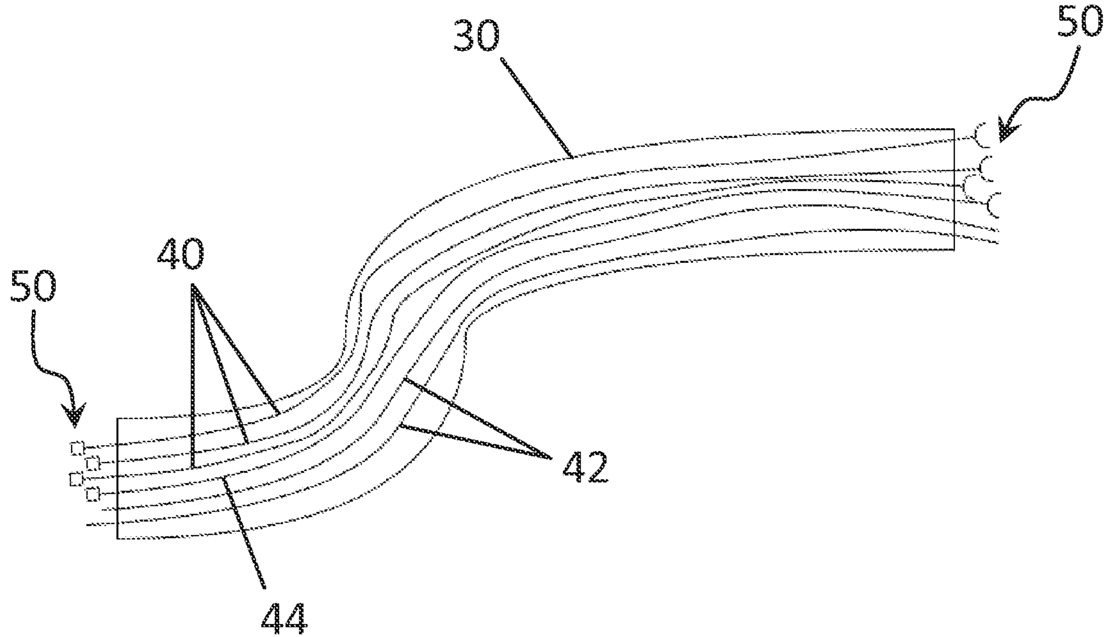
FIG. 3: a schematic illustration of the protection means with motor lines running inside it.

FIG. 3 schematically shows an exemplary embodiment of the flexible protection means 30 with the motor lines 40, 42, 44 running therein, in this case three energy supply lines 40, a control/signal line 44 and two coolant lines 42.

Preferably, the energy supply lines 40 and the control/signal line 44 each comprise electrical connectors or connections 50, in fact, preferably at both ends, so that they can be disconnected from the connections on the traction drive 22 and the inverter in a fast and simple manner. Alternatively, common connections could also be provided at the ends of the protection means 30 (for example, according to the principle of a multi-coupling), which include the respective connections for the motor lines 40, 42, 44.

As can be seen in FIG. 2, the duty-cycle crawler crane 10 shown here has a central ballast 16 mounted on the middle part 13 at the front and rear between each of the crawler carriers 20. This can preferably be optionally attached or detached, depending on the application. Due to the flexible protection means 30, the routing of the motor lines 40, 42, 44 can thus be adapted to the mounting condition of the central ballast 16. Also, the external routing of the motor lines 40, 42, 44 makes it easy to reach their connections 50, which considerably facilitates the mounting/demounting of the crawler carriers 20.

In summary, the flexible protection means 30 result in the following advantages:

The direct and external routing of the motor lines 40, 42, 44 of the traction drives 22 provides easy accessibility.

The easy accessibility allows for mounting/demounting the motor lines 40, 42, 44 on the traction drive 22 or on the inverter in a simple manner. This means that the traction drives 22 can be quickly and easily decoupled from the motor lines 40, 42, 44 during mounting/demounting due to transport.

Due to the flexibility of the protection means 30, the cable routing can be adapted to the current machine configuration, for example the presence of a central ballast 16 or according to the assembly state.

The motor lines 40, 42, 44 can be routed in the external area of the work machine 10 in a protected manner. The flexible protection means 30 ensures mechanical protection for the motor lines 40, 42, 44.

Compared to the prior art, this results in shorter cable lengths between traction drive 22 and inverter for all motor lines 40, 42, 44, which has a positive effect on the signal transmission quality, in particular in the case of resolver cables.

LIST OF REFERENCE CHARACTERS

10 Work machine
12 Undercarriage
13 Middle part
14 Superstructure
15 Slewing ring

16 Central ballast
17 Driver's cab
20 Crawler carrier
22 Traction drive
30 Protection means
40 Energy supply line
42 Signal/control line
44 Coolant line
50 Connections

The invention claimed is:

1. Work machine, having an undercarriage which comprises a middle part and at least one crawler carrier connected to the middle part and having at least one electric traction drive, wherein at least one energy transmission line for supplying power to the traction drive and at least one further supply line runs between the traction drive and the middle part, wherein the at least one energy supply line and the at least one further supply line run together in a separate protection means outside the middle part and the crawler carrier, and one end of each of the at least one energy supply line and the at least one further supply line comprises an accessible connection configured to be disconnected and reconnected to the middle part.

2. Work machine according to claim 1, wherein the protection means is configured to be flexible at least in sections, wherein at least one guide element for guiding the flexible protection means is arranged on the middle part and/or on the crawler carrier.

3. Work machine according to claim 1, wherein the protection means comprises an energy chain and/or a hose jacket.

4. Work machine according to claim 1, wherein the protection means completely surrounds the at least one energy supply line and the at least one further supply line.

5. Work machine according to claim 1, wherein the lines running inside the protection means have connections via which they can be detached from connections on the middle part side and/or on the traction drive side.

6. Work machine according to claim 5, wherein the connections for making and disconnecting the connections are accessible from outside the middle part and/or crawler carrier and, are arranged outside the middle part and/or crawler carrier in the connected state.

7. Work machine according to claim 1, wherein at least one further supply line is a coolant line for providing coolant for the traction drive.

8. Work machine according to claim 1, wherein at least one further supply line is a signal line for transmitting control signals to the traction drive and/or sensor signals to a controller.

9. Work machine according to claim 1, wherein at least two energy supply lines are provided for supplying power to the traction drive.

10. Work machine according to claim 1, wherein the at least one energy supply line and at least one signal line connect the traction drive to an inverter, which is arranged in the middle part of the undercarriage.

11. Work machine according to claim 1, wherein the cable routing of the protection means is adaptable to a machine configuration of the work machine.

12. Work machine according to claim 1, comprising at least two crawler carriers which are connected to the middle part and which each have at least one traction drive whose at least one energy supply line and at least one further supply line run to the middle part in the separate protection means.

13. Work machine according to claim 1, wherein the work machine is a duty-cycle crawler crane.

14. Work machine according to claim 1, wherein the at least one electric traction drive includes a first electric traction drive and a second electric traction drive, wherein the at least one energy supply line includes a first energy supply line and a second energy supply line, wherein the accessible connections include a first accessible connection of the first energy supply line, and a second accessible connection of the second energy supply line, and wherein the first accessible connection is configured to connect to the first electric traction drive, and the second accessible connection configured to connect to the second electric traction drive.

15. Work machine according to claim 1, wherein each of the at least one energy supply lines supply power from a high voltage (HV) vehicle electrical system to a corresponding electric traction drive of the at least one electric traction drive.

16. Work machine according to claim 1, wherein the middle part comprises an inverter, wherein the accessible connection for each of the at least one energy transmission lines is configured to connect to the inverter at the one end, and wherein each of the at least one energy transmission lines is further configured to connect to one of the at least one electric traction drives at an opposite end.

17. Work machine according to claim 1, wherein a second, opposing end of each of the at least one energy supply line and the at least one further supply line comprises a further accessible connection configured to be disconnected and reconnected to one of the at least one electric traction drives.

18. Work machine according to claim 1, wherein the accessible connections are routed outside a steel structure of the undercarriage, the accessible connections configured to be accessible from outside the middle part in a connected state.

19. Work machine according to claim 1, wherein the at least one energy supply line and the at least one further supply line are motor lines, and wherein the motor lines are routed directly from the middle part to the at least one electric traction drive.

20. Work machine according to claim 19, wherein the at least one energy supply line and the at least one further supply line are run in a flexible protection means, wherein the at least one energy supply line and the at least one further supply line are configured to be adapted to a first route when a central ballast element is attached to the work machine, and wherein the at least one energy supply line and the at least one further supply line are configured to be adapted to a second route when the central ballast element is remove from the work machine.

* * * * *